United States Patent
Yamashita et al.

(10) Patent No.: US 6,507,446 B2
(45) Date of Patent: Jan. 14, 2003

(54) POSITIONING METHOD OF OPTICAL ELEMENT, POSITIONING MEMBER OF OPTICAL ELEMENT AND OPTICAL UNIT, AND MANUFACTURING METHOD THEREOF

(75) Inventors: Teruo Yamashita, Tokyo (JP); Yoshiatsu Yokoo, Saitama (JP); Shigeru Hayashi, Yamanashi (JP)

(73) Assignee: Hoya Corporation, Tokyo (JP)

(*) Notice: Subject to any disclaimer, the term of this patent is extended or adjusted under 35 U.S.C. 154(b) by 0 days.

(21) Appl. No.: 09/893,745

(22) Filed: Jun. 29, 2001

(65) Prior Publication Data

US 2002/0015239 A1 Feb. 7, 2002

(30) Foreign Application Priority Data

Jun. 30, 2000 (JP) .................................. 2000-199714
Jun. 20, 2001 (JP) .................................. 2001-187050

(51) Int. Cl.⁷ .............................. G02B 7/02; G02B 9/00
(52) U.S. Cl. ..................................... 359/811; 359/664
(58) Field of Search ........................ 359/811, 708, 359/819, 664; 396/526; 362/455; 353/100; 385/33, 35

(56) References Cited

U.S. PATENT DOCUMENTS 4,548,464 A * 10/1985 Auracher et al. ......... 106/14.12
5,380,551 A * 1/1995 Blonder et al. ............. 118/500
5,611,006 A * 3/1997 Tabuchi ....................... 385/14
6,363,201 B2 * 3/2002 Sherrer et al. .............. 385/137

FOREIGN PATENT DOCUMENTS

| JP | 59-36214 | 2/1984 | ............ G02B/7/26 |
| JP | 2-22884 | 1/1990 | ............ H01S/3/18 |
| JP | 7-93457 | 10/1995 | ........... H01L/33/00 |

OTHER PUBLICATIONS

Abstract 59-36214, Feb. 28, 1984.
Abstract 2-22884, Jan. 25, 1990.
Patent abstract of Japan 04-261076, Sep. 17, 1992.

* cited by examiner

Primary Examiner—Georgia Epps
Assistant Examiner—Saeed Seyrafi
(74) Attorney, Agent, or Firm—Sughrue Mion, PLLC

(57) ABSTRACT

The lateral V-shaped groove (2) and the longitudinal V-shaped groove (3), which cross each other, are formed on a surface of the substrate (1). When the optical element (100) is contacted with and supported by four ridges composed of sides (21, 22) of one V-shaped groove and sides (31, 32) of the other V-shaped groove, the optical element is positioned at the three-dimensional support position which is geometrically determined by the four points at which the four ridges and the surface of the optical element come into contact with each other.

22 Claims, 15 Drawing Sheets

UPPER CORNER CHIPPING
OF V-SHAPED GROOVE

CHIP CUTTING LINE

3 BY 3 LENS ARRAY

2 BY 2 LENS ARRAY

LENS CHIP

CROSS-SECTIONAL VIEW OF LINE B-B'

CROSS-SECTIONAL VIEW OF LINE A-A'

DISK TYPE LENS CHIP

ERROR SPHERE HEIGHT OF 9 BY 6
V-SHAPED GROOVE GRID

POSITIONING METHOD OF OPTICAL ELEMENT, POSITIONING MEMBER OF OPTICAL ELEMENT AND OPTICAL UNIT, AND MANUFACTURING METHOD THEREOF

BACKGROUND OF THE INVENTION

1. Field of the Invention

The present invention relates to a positioning method of an optical element, a positioning member of the optical element and an optical unit using the optical element used for interconnection of a face light emitting laser array or an array type optical element, coupling between optical fibers for optical communication use, a collimate optical system, a micro lens in a neighboring field optical system in an optical memory and a micro lens array. Also, the present invention relates to a manufacturing method thereof.

2. Description of the Related Art

The technique for positioning and mounting an optical element such as a spherical lens on a predetermined substrate is disclosed, for example, in Japanese Unexamined Patent Publication No. 59-36214 and Japanese Examined Patent Publication No. 7-93457.

According to the technique disclosed in Japanese Unexamined Patent Publication No. 59-36214, a spherical lens is made to come into contact with sides (inclined planes) and bottom faces of V-shaped grooves formed on a substrate so as to position the spherical lens. According to the technique disclosed in Japanese Examined Patent Publication No. 7-93457, a spherical lens is positioned and supported as follows. Two V-shaped grooves are made to cross each other so that they can be formed into a T-shape. At the intersection of these V-shaped grooves, a spherical lens is contacted with two ridges which are formed when two sides (two inclined planes) of one V-shaped groove cross one side of the other V-shaped groove and also the spherical lens is contacted with a side of the other V-shaped groove which is opposed to the above two ridges. In this way, the spherical lens is positioned and supported.

According to the technique disclosed in Japanese Unexamined Patent Publication No. 59-36214, when the spherical lens is arranged in the V-shaped groove, it is possible to position the spherical lens in the width and the height direction of the V-shaped groove, however, it is impossible to position the spherical lens in the longitudinal direction of the V-shaped groove. Therefore, it is necessary to determine the most appropriate position by moving the spherical lens in the longitudinal direction of the V-shaped groove after the spherical lens has been arranged in the V-shaped groove, and this positioning work is complicated. Further, when the spherical lens is moved to the most appropriate position, there is a possibility that a shell-shape chipping is caused on the side of the V-shaped groove.

According to the technique disclosed in Japanese Examined Patent Publication No. 7-93457, it is necessary to form two V-shaped grooves on a substrate so that the two V-shaped grooves can cross each other like a T-shape. The only method of forming such a shape on the substrate is a method of anisotropic etching at present. Since the diameter of a spherical lens is usually 100 $\mu$m to 1 mm, the depth of this V-shaped groove must be not less than 100 $\mu$m. In the case where the V-shaped groove, the depth of which is not less than 100 $\mu$m, is formed by means of anisotropic etching, a quantity of etching is so large that it is difficult to control the quantity of etching, that is, it is very difficult to form a V-shaped groove having an accurate profile, and further it takes a very long time for etching. For the above reasons, it has been recently difficult to position a spherical lens with high accuracy of not more than several $\mu$m.

SUMMARY OF THE INVENTION

The present invention has been accomplished in view of the above circumstances. It is an object of the present invention to provide a positioning method of an optical element, a positioning device and an optical element and a manufacturing method thereof by which the optical element such as a spherical lens can be positioned with high accuracy not more than several $\mu$m.

In order to solve the above problems, the first aspect is a positioning method of an optical element for positioning the optical element by arranging the optical element at an intersection of V-shaped grooves which are formed on a surface of a substrate and cross each other, characterized in that: when the optical element is arranged at the intersection of the V-shaped grooves, the optical element is supported by four points of contact at which four ridges formed in the intersection and a surface of the optical element come into contact with each other so that the optical element is three-dimensionally positioned.

The second aspect is a positioning method of an optical element according to the first means, wherein the V-shaped grooves are formed by means of machining.

The third aspect is a positioning method of an optical element according to the second means, wherein the V-shaped grooves are formed by means of formed tool grinding in which a formed grinding tool is used.

The fourth aspect is a positioning method of an optical element according to one of the first, second and third means, wherein the optical element is a spherical lens.

The fifth aspect is a positioning member of an optical element characterized in that: V-shaped grooves are formed on a surface of a substrate; and the optical element is positioned when the optical element is supported at our points on four ridges formed in an intersection of the V-shaped grooves.

The sixth aspect is a positioning member of an optical element according to the fifth aspect, wherein the intersection of the V-shaped grooves is formed into an array-shape.

The seventh aspect is a positioning member of an optical element according to the fifth or the sixth aspect, wherein the substrate is made of glass.

The eighth aspect is an optical unit comprising: a substrate, on the surface of which V-shaped grooves crossing each other are formed; and an optical element positioned and fixed when it is supported at four points on four ridges formed in the intersection of the V-shaped grooves.

The ninth aspect is an optical unit according to the eighth aspect, wherein an opening for making a beam of light to be incident on or emergent from the optical element is formed on the substrate.

The tenth aspect is an optical unit according to the eighth or ninth aspect, wherein the optical element is a spherical lens.

The eleventh aspect is an optical unit according to one of the eighth, ninth and tenth aspect, characterized in that: one of the substrate and the optical element or both the substrate and the optical element are made of glass.

The twelfth aspect is an optical unit according to one of the eighth, ninth, tenth and eleventh aspect, wherein the three-dimensional positional accuracy of the optical element is in a range ±5 $\mu$m.

The thirteenth aspect is a manufacturing method of an optical unit comprising the steps of:

a positioning step for positioning an optical element when the optical element is supported at four points on four ridges formed in an intersection of the V-shaped grooves; and a fixing step for fixing the optical element, which has been positioned in the positioning step, at the substrate or an optical element fixing member except for the substrate.

The fourteenth aspect is a manufacturing method of an optical unit comprising the steps of:

a positioning step for positioning an optical element when the optical element is supported at four points on four ridges formed in an intersection of the V-shaped grooves;

a fixing step for fixing the optical element, which has been positioned in the positioning step, at the substrate or an optical element fixing member except for the substrate; and an opening forming step for forming an opening by removing a portion of the substrate so that a beam of light can be incident on or emergent from the optical element.

The fifteenth aspect is a manufacturing method of an optical unit according to the thirteenth aspect or the fourteenth aspect, wherein the V-shaped grooves are formed by means of machining.

The sixteenth aspect is a manufacturing method of an optical unit according to one of the thirteenth, the fourteenth and the fifteenth aspect, wherein the V-shaped grooves are formed by means of formed tool grinding in which a formed grinding tool is used.

The seventeenth aspect is a manufacturing method of an optical unit according to one of the thirteenth, the fourteenth, the fifteenth and the sixteenth aspect, wherein the optical element is a spherical lens.

The eighteenth aspect is a manufacturing method of an optical unit in which a hemispherical or super hemispherical optical elements are held, comprising the steps of:

a positioning step for positioning an optical element when the optical element is supported at four points on four ridges formed in an intersection of V-shaped grooves of a substrate, which cross each other on a surface of the substrate;

a fixing step for housing at least a part of the upper portion of the optical element, which has been positioned in said positioning step, in a housing hole of a hole array substrate, of which the diameter is larger than that of said optical element, and fixing said optical element on side surfaces of said housing hole; and a lens grinding step, wherein after said substrate is removed, the exposed portion of the optical element that has been fixed onto said hole array substrate is ground and removed.

The nineteenth aspect is a manufacturing method of an optical unit, wherein said substrate has through-holes communicating with the substrate rear surface at said V-shaped grooves, and at least said fixing step includes a step of giving vacuum from said through-holes.

The twentieth aspect is lens chip characterized in that it is manufactured by diving the optical unit having the plural optical elements, which has been manufactured by the manufacturing method of the optical unit according to fourteenth aspect.

The twenty first aspect is a lens chip characterized in that it is manufactured by diving the optical unit having the plural optical elements, which has been manufactured by the manufacturing method of the optical unit according to the eighteenth aspect.

The twenty second aspect is a floating-type head for optical memory medium having an optical system including a lens chip for optically reading data recorded on an optical memory medium by running on the optical memory medium floatingly, characterized by being manufactured using the lens chip according to the twenty first aspect as said lens chip.

DESCRIPTION OF THE PREFERRED EMBODIMENTS

Figure 1A:
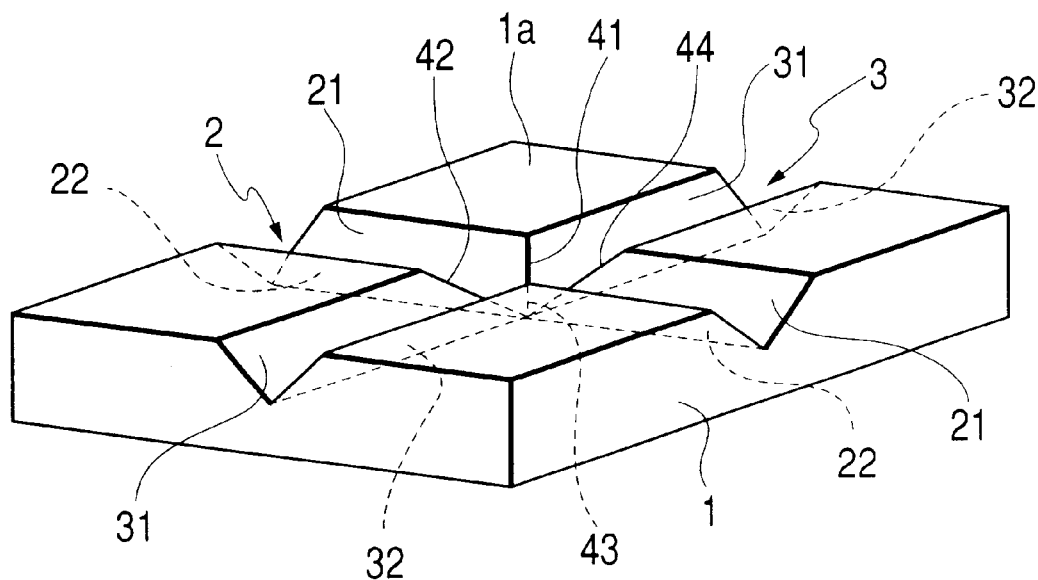
FIGS. 1(a) and 1(b) show perspective views showing a structure of a positioning member of an optical element of an embodiment of the present invention.
Figure 1B:
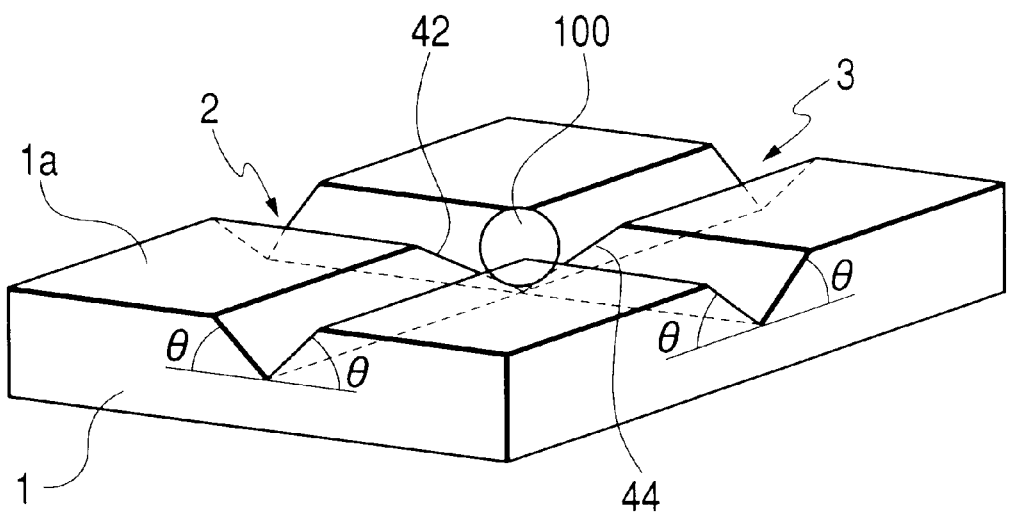
Figure 2:
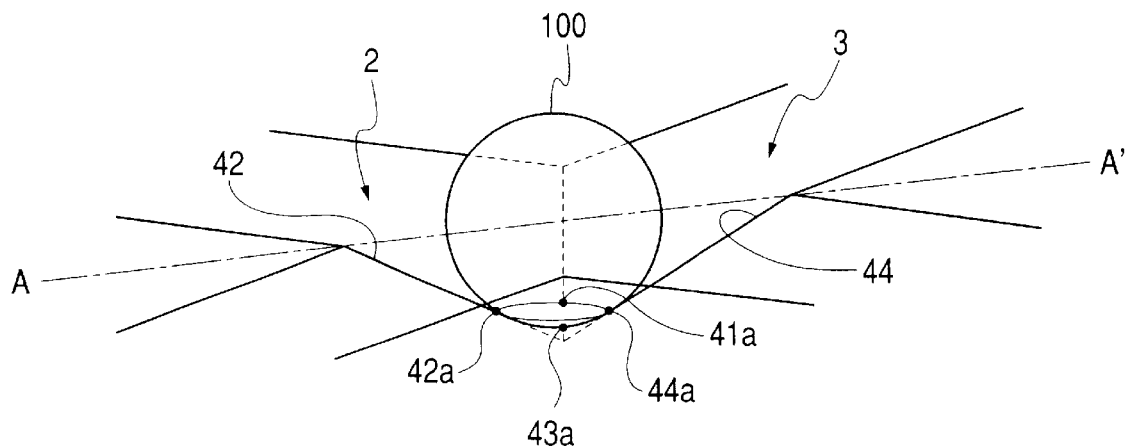
FIG. 2 shows a schematic illustration showing a positioning member of an optical element of an embodiment of the present invention.
Figure 3:
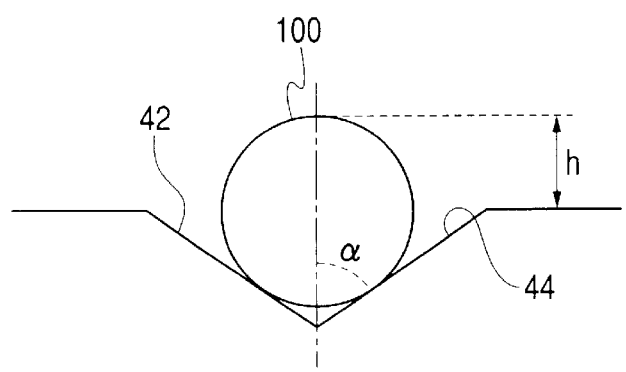
FIG. 3 shows a cross-sectional view taken on line A–A1 in FIG. 2.
Figure 4:
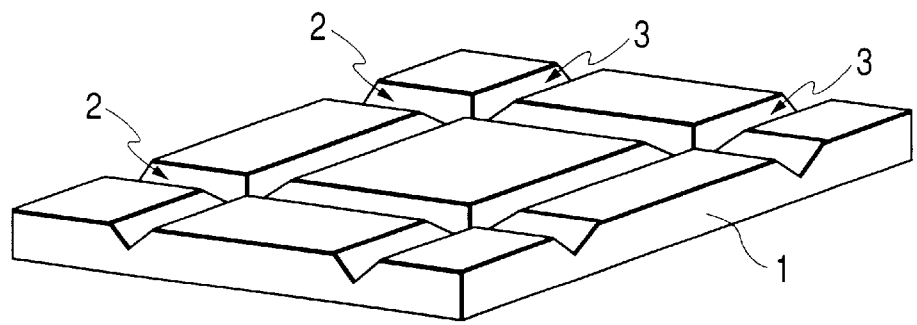
FIG. 4 shows a view showing one variation of a positioning member of an optical element of an embodiment of the present invention.
Figure 5:
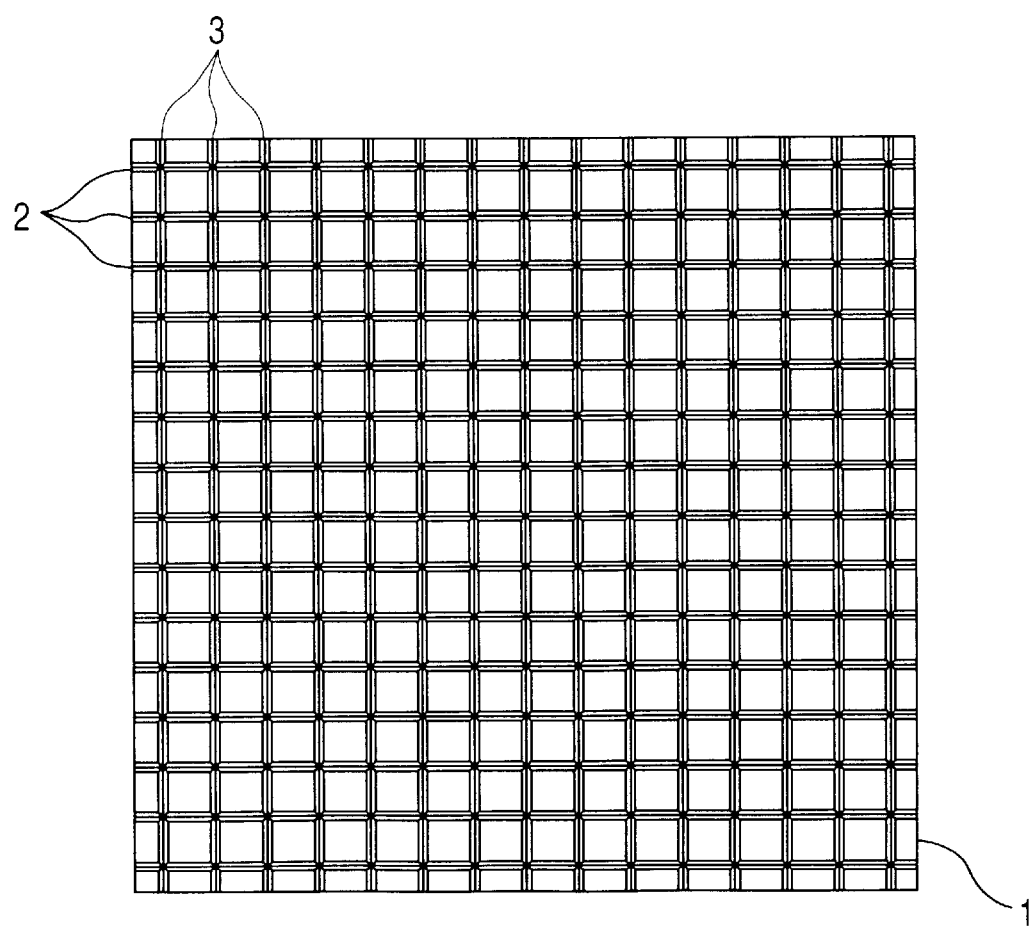
FIG. 5 shows a view showing another variation of a positioning member of an optical element of an embodiment of the present invention.

FIG. 1 is a perspective view showing a structure of a positioning member of an optical element of an embodiment of the present invention, FIG. 2 is a schematic illustration showing a positioning member of an optical element of an embodiment of the present invention, FIG. 3 is a cross-sectional view taken on line A–A1, in FIG. 2, and FIGS. 4 and 5 are views showing a variation of a positioning member of an optical element of an embodiment of the present invention. Referring to these drawings, a positioning method and a positioning device of an optical element of an embodiment of the present invention will be explained below. Next, a manufacturing method of a positioning member of an optical element of an embodiment of the present invention will be explained below. Further, an optical element and a manufacturing method thereof of an embodiment of the present invention will be explained below.

In FIG. 1, the positioning member of the optical element of this embodiment is composed in such a manner that the lateral V-shaped groove 2 and the longitudinal V-shaped groove 3 are formed on one surface 1a of the substrate 1 so that both the V-shaped grooves cross each other. In the intersection of the lateral V-shaped groove 2 and the longitudinal V-shaped groove 3, four ridges 41, 42, 43, 44 are formed by two sides 21, 22 of the lateral V-shaped groove 2 and by two sides 31, 32 of the longitudinal V-shaped groove 3.

The positioning member of the optical element of this embodiment conducts positioning of the spherical lens 100 when the spherical lens 100 is arranged so that the surface of the spherical lens 100 can be contacted with the four ridges 41, 42, 43, 44 as shown in FIG. 1b.

When the spherical lens 100 is arranged so that the surface of the spherical lens 100 can be contacted with the four ridges 41, 42, 43, 44, as shown in FIG. 2, the surface of the spherical lens 100 comes into contact with the four ridges 41, 42, 43, 44 at four points 41a, 42a, 43a, 44a. Therefore, the spherical lens 100 can be supported at four three-dimensional support positions which are geometrically determined.

The substrate 1 is composed of a piece of soda-lime glass, the thickness of which is 3.0 mm, the length of which is 5.0 mm and the width of which is 5.0 mm. The depth of the lateral V-shaped groove 2 is 0.612 mm, and also the depth of the longitudinal V-shaped groove 3 is 0.612 mm. An angle θ formed between a plane, which is parallel with the substrate 1 including the bottom ridge of the V-shaped groove, and both sides (21, 22, 31, 32) of the V-shaped groove is 45°. In this case, as shown in FIG. 3, an angle formed by the ridges 41, 43 opposed to each other or an angle a (half angle) formed by the ridges 42, 44 is 54.7°, that is, the total angle is 109.4°.

The diameter of the spherical lens 100 is 1 mm When the spherical lens 100 is arranged and positioned so that the surface of the spherical lens 100 can be contacted with the four ridges 41, 42, 43, 44 formed on the substrate 1, the height h of the vertex of the spherical lens 100 is 0.500 mm from the surface 1a of the substrate 1. In this case, the height h of the vertex of the sphere is defined as a distance from the upper face of the substrate of the V-shaped groove to the upper vertex of the spherical lens 100.

FIG. 4 is a perspective view showing a structure of a variation of a positioning member of an optical element of an embodiment of the present invention. In this example, on the substrate 1 composed of a piece of boro-silicated glass, the thickness of which is 5.0 mm, the length of which is 7.5 mm and the width of which is 7.5 mm, two lateral V-shaped grooves 2 and two longitudinal V-shaped grooves 3 are formed, so that four intersections are formed by those lateral V-shaped grooves 2 and longitudinal V-shaped grooves 3. In the four intersections, four spherical lenses 100 are respectively arranged and positioned.

FIG. 5 is a perspective view showing a structure of another variation of a positioning member of an optical element of an embodiment of the present invention. In this example, on the substrate 1 composed of a piece of soda-lime glass, the thickness of which is 3.0 mm, the length of which is 75 mm and the width of which is 75 mm, 15 lateral V-shaped grooves 2 and 15 longitudinal V-shaped grooves 3 are formed, so that 225 intersections are formed by those lateral V-shaped grooves 2 and longitudinal V-shaped grooves 3. In the 225 intersections, 225 spherical lenses 100 are respectively arranged and positioned.

Next, a manufacturing method of a positioning member of an optical element of an embodiment will be explained below. In this manufacturing method of the positioning member of the optical element of the embodiment, the positioning member of the optical device shown in FIG. 5 is manufactured with a grinding wheel for making a V-shaped groove.

Figure 6A:
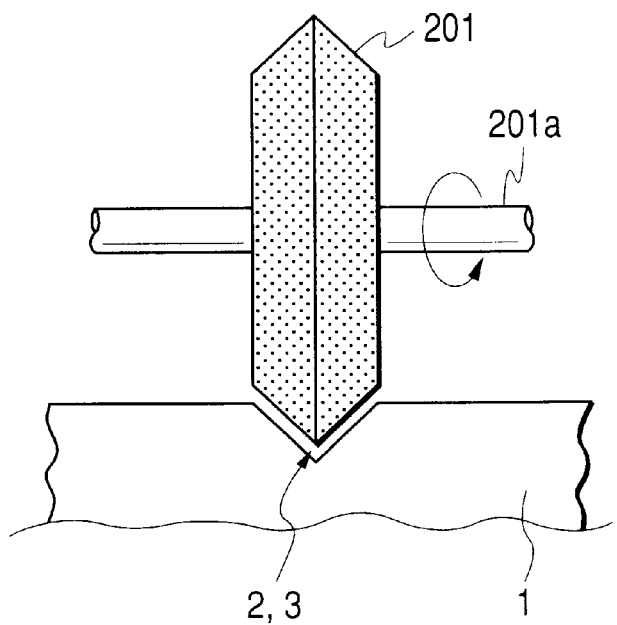
FIGS. 6(a) and 6(b) show schematic illustrations in the case of forming a V-shaped groove with a grinding wheel.

First, formed tool grinding is conducted on a surface of a substrate composed of a piece of soda-lime glass (3.0×75×75 mm) with a grinding wheel for making a V-shaped groove, the forward end angle of which is 90°. By this formed tool grinding, 15 V-shaped grooves, which are parallel with each other, are formed, and thus formed 15 V-shaped grooves are made to be the lateral V-shaped grooves 2. FIG. 6(a) is a view showing a grinding wheel for making a V-shaped groove. As shown in FIG. 6(a), the grinding wheel 201 for making a V-shaped groove is formed in such a manner that the profile of an outer circumferential end section of a disk-shaped grinding wheel is formed into a substantial V-shape with the cross angle 90°. While the rotary shaft 201a is rotating, the V-shaped portion of this grinding wheel 201 is pressed against the surface of the substrate 1 so as to conduct grinding. In this case, the grinding wheel 201 for making a V-shaped groove is attached to a super-precision grinding machine, the grinding wheel shaft positioning accuracy of which is not more than 0.2 μm and the resolution of which is 0.1 μm. Therefore, grinding can be conducted with the above accuracy.

Next, the glass substrate 1 is turned by 90° in the direction of its surface. Then, 15 longitudinal V-shaped grooves 3, the depth of which is the same as that of the lateral V-shaped grooves 2, which are perpendicular to the rows of the lateral V-shaped grooves 2, are formed on the surface of the substrate 1 by the same machining method. Due to the foregoing, it is possible to make a V-shaped groove grid having 225 grid points (intersections). In this connection, the pitch between the V-shaped grooves are 5.0 mm, which is all the same.

A glass ball or steel ball, the diameter of which was 1 mm (the diameter accuracy was not more than ±0.04 μm) was mounted on each grid point on the glass substrate 1 on which the V-shaped grids were formed. Deviation of the height of the vertex of the sphere was in a range not more than 1 μm, and the pitch accuracy in the direction X and that in the direction Y were in a range ±0.3 μm. In this way, the positioning accuracy was very high.

The reason why the above high positioning accuracy was obtained is described as follows. A point of contact of the ridge, which is formed by the sides (inclined planes) of the V-shaped grooves perpendicular to each other, with the sphere is determined by geometrical profiles. Four ridges necessarily have a point of contact with the sphere surface.

Therefore, the sphere is necessarily supported by the four points. Accordingly, the spheres arranged on the glass substrate can be stably supported. Further, the positional accuracy of the spheres greatly depends upon the machining accuracy of the V-shaped grooves and the dimensional accuracy of the spheres. Therefore, it is possible to easily obtain the positional accuracy of submicron to several micron.

Since the ridge composed of the sides (inclined planes) of the V-shaped grooves perpendicular to each other, which have been subjected to grinding with an appropriate grinding wheel for making a V-shaped groove and in an appropriate grinding condition, is a very sharp ridge having no chipping (the radius of curvature is not more than 1 $\mu$m, and the chipping size is not more than 1 m), the positioning accuracy mainly depends upon the machining accuracy of the V-shaped groove (pitch accuracy and depth accuracy). Accordingly, when a super precise grinding machine, the positioning accuracy of the grinding shaft of which is not more than 0.1 $\mu$m and the resolution of which is not more than 0.1 $\mu$m, is used for grinding, it is easy to enhance the positioning accuracy of the sphere to a range of submicron or a range not more than ±5 $\mu$m (it is more preferable that deviation of the height of the vertex of each sphere and the pitch accuracy are not more than ±1 $\mu$m).

Further, it is possible to consider the following reasons. Even if some errors of machining in the depth direction of the V-shaped groove are caused, it is definitely possible to ensure the support of four points. According to the procedure of grinding of the present invention, the lateral V-shaped grooves are formed, and then the longitudinal grooves, which are perpendicular to the lateral V-shaped grooves, are formed. Due to the foregoing, points of contact of four ridges, which are formed by the sides of the V-shaped grooves crossing each other, with the sphere necessarily exist on the same plane. The reason will be described below. In the case where the V-shaped grooves crossing each other are formed by grinding, the ridges are formed when the sides of the two V-shaped grooves, which are perpendicular to other, cross each other. Therefore, even if errors are caused in the depth direction in the process of grinding, at least two points of contact in the four points of contact necessarily form a pair (two points of contact, which are not located on a diagonal, form a pair) and move.

Figure 7:
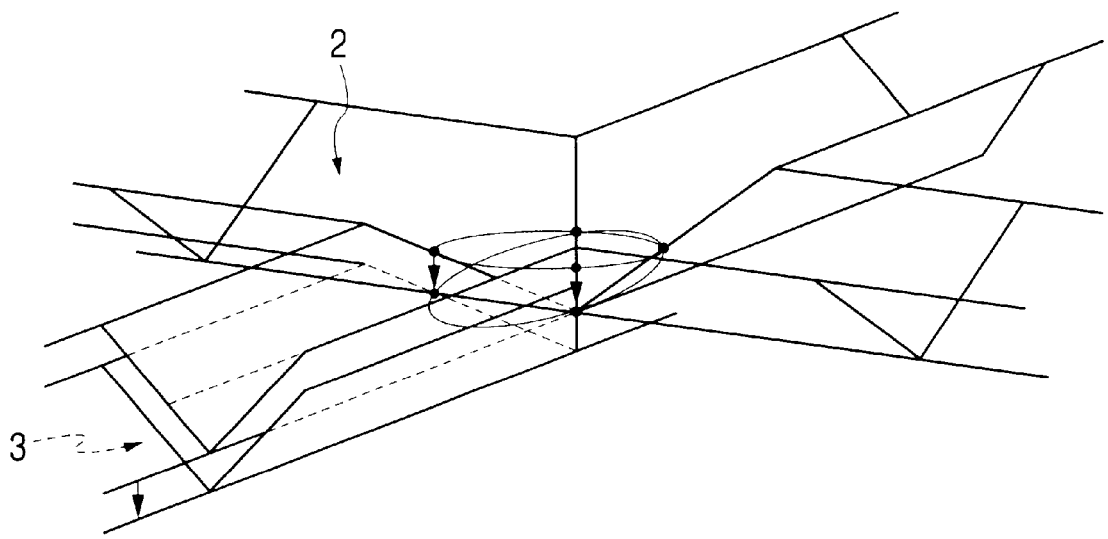
FIG. 7 shows a schematic illustration for explaining that four contact points are on the same plane even if the depth of the V-shaped grooves crossing each other is changed.

For example, in the case of forming a large number of V-shaped groove grids, in the process of actual grinding work, an upper face of the workpiece (glass substrate) is inclined (flatness and parallelism). Therefore, in some cases, the depth of the thus formed V-shaped groove continuously becomes shallow or deep in the feeding direction of the grinding wheel. It is very difficult to reduce a change in the depth of the V-shaped groove with respect to the upper face of the substrate to a value not more than a level of submicron. Even in this case, two ridges formed by connecting two points of contact on the V-shaped groove sides formed later necessarily become parallel to each other (the four points of contact are necessarily located on the same plane). Therefore, it is possible to ensure the support of four points, and the positioning can be accomplished with high accuracy in which the three dimensional positioning accuracy of the position of the center of gravity of the sphere can be kept in a range ±1 $\mu$m. FIG. 7 is a schematic illustration to explain that the our points of contact are located on the same plane even if the depth of the thus formed V-shaped grooves crossing each other is changed. In order to simplify the explanation, FIG. 7 shows a case in which a change in the depth of the lateral V-shaped groove or the longitudinal V-shaped groove is discontinuous before and after the grid point. Since the four points of contact are necessarily located on the same plane even if the depth of the V-shaped groove is changed, there is no possibility of the contact of three or two points. Therefore, the ridges and the sphere necessarily come into contact with each other at four points of contact. In the case where the groove depth in the lateral direction and the groove depth in the longitudinal direction are changed, the circumstances are the same as those described above.

According to the positioning method and the members of this embodiment, it is possible to transfer the profile of the grinding wheel for making a V-shaped groove to a workpiece at the level of submicron. Therefore, even if the cross-sectional shape itself of the grinding wheel is not an ideal V-shape, it is possible to conduct positioning with accuracy. The reason why it is possible to conduct positioning with accuracy is described as follows. The positioning accuracy is not determined by the accuracy itself of the shape of the V-shaped groove, but the accuracy of the pitch of the side of the groove and the accuracy of the depth between the V-shaped groove determine the positioning accuracy. That is, when the accuracy of the pitch of the side of the groove and the accuracy of the depth between the V-shaped groove are made to be constant, it is possible to make the accuracy of the pitch between the m by n V-shaped groove grid (position of the center of gravity of the sphere) to be constant and also it is possible to make the accuracy of the depth between the V-shaped grooves to be constant, so that the position of the sphere to be mounted can be made constant. In the embodiment of the present invention, it is possible to use a super precise grinding machine. Therefore, it is relatively easy to transfer the profile of the grinding wheel for making a V-shaped groove to a workpiece at the level of submicron. Accordingly, the pitch of the sides of the V-shaped grooves and the accuracy of the depth between the V-shaped grooves can be made constant at the level of submicron. Due to the foregoing, the surface pitch of the m by n V-shaped groove grid and the accuracy of the depth between the V-shaped grooves can be made constant, so that the positional accuracy of the sphere to be mounted can be kept in a range ±1 $\mu$m.

Figure 8:
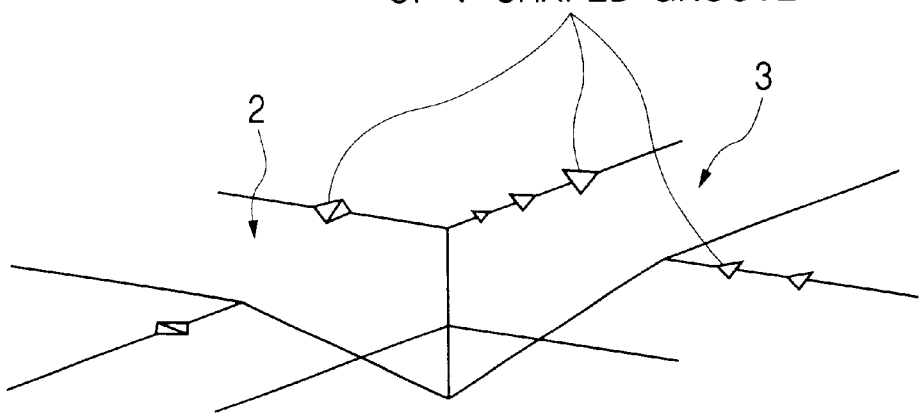
FIG. 8 shows a schematic illustration for explaining a difference in the chipping size between the corner of the upper face of the V-shaped groove and the ridge in the V-shaped groove intersection.

In the positioning member of the embodiment of the present invention, the occurrence of chipping can be remarkably reduced. The reason is that the V-shaped groove can be formed by a V-shaped grinding wheel, the contact area with the substrate of which is small. In the case where the V-shaped groove crossing the V-shaped groove, which has been formed previously, is formed by grinding with a grinding wheel, spaces on both sides of the grinding wheel are open. Therefore, grinding chips and grinding water can be smoothly discharged from the contact point or the contact face of the grinding wheel with the workpiece at the point of grinding. Accordingly, grinding chips are seldom interposed between the grinding wheel and the point of grinding, and there is no possibility of a rise in temperature in a small local portion. As a result, chipping seldom occurs especially in the ridge section. Even if chipping occurs, the size of chipping is very small. The inclination angle of the ridge formed when the V-shaped groove sides cross each other is an obtuse angle with respect to the substrate face. Accordingly, for example, compared with a case in which a vertical ridge, vertex or vertical angle, which is formed at the intersection of the recessed grooves, are formed, the occurrence of chipping is remarkably reduced in the process of grinding. It was confirmed that this effect could be provided in the case where a grinding wheel, the grinding grain size of which was 10 to 20 μm, was used. FIG. 8 is a schematic illustration for explaining a difference in the chipping size between the corner of the upper face of the V-shaped groove and the ridge in the V-shaped groove intersection. As shown in FIG. 8, the chipping size on the upper face of the V-shaped groove is 5 to 10 μm. On the other hand, the chipping size at the ridge in the V-shaped groove intersection is not more than submicron, which will seldom affect the positioning accuracy of the optical element. Conventionally, it has been considered that it is difficult to reduce the chipping size at the ridge in the V-shaped groove intersection to be smaller than that on the upper face of the V-shaped groove.

In the positioning member of this embodiment, the following are confirmed. When a spherical lens is arranged and positioned in the positioning member, even if a pushing force and thermal stress are somewhat given to the positioning member, a point of contact of the ridge, which is a support section, with the spherical lens is seldom chipped, so that it is possible to use the positioning member repeatedly. Especially, compared with a conventional positioning member in which the spherical lens is supported by the side of the V-shaped groove, the positioning member of this embodiment has a higher durability than that of the conventional positioning member. The reason is considered as follows. A force given to the positioning member can be easily relieved in the case where the oblique ridge comes into contact with the sphere compared with a case in which the face comes into contact with the sphere. That is, the reason is considered as follows. In the case of four point support in which the sphere is supported by the inclined ridges, when a force, the intensity of which is higher than a predetermined value, is given to the spherical lens in the direction of a composite vector of the gravity and other forces, this force is not given to a specific point of contact, but the force is given in such a manner that the force is relieved and shifted outside under the condition that the sphere is lifted upward and moved onto the side of the V-shaped groove, that is, as if the sphere were raised and derailed. As a result, it is possible to effectively prevent a force, the intensity of which is not lower than a threshold value of damage of material, from being given to the point of contact in the process of positioning. Therefore, chipping is seldom caused in the ridge. This tendency is more remarkable in the case where the spherical lens and the substrate are made of glass than the case where the spherical lens and the substrate are made of silicon. It is most preferable that both the substrate and the spherical lens are made of glass.

In the positioning method and device of this embodiment, even in the case where several hundred spherical lenses are mounted on a substrate of several inches square, since the support section positioning section) is composed of the ridge and the spherical lens which are contacted with each other at points, foreign objects such as dust are seldom interposed between the ridge and the spherical lens. Accordingly, there is no possibility that the accuracy is deteriorated by the foreign objects interposed between the ridge and the spherical lens.

In this connection, in the above embodiment, the spherical lens such as a spherical lens, hemispherical lens or super hemispherical lens is used as the optical element. However, as long as the optical element can be positioned by making the surface of the optical element come into contact with the four ridges, the present invention can be applied to any optical element. In the above embodiment, the lateral V-shaped groove crosses the longitudinal V-shaped groove making a right angle, however, the present invention is not necessarily limited to the specific embodiment in which the lateral V-shaped groove crosses the longitudinal V-shaped groove making a right angle. As long as the V-shaped grooves cross each other being adopted to the profile of the optical element to be mounted, any V-shaped grooves may be adopted.

In the above embodiment, an angle θ (shown in FIG. 1) formed between both sides (21, 22, 31, 32) and the plane parallel with the substrate 1 including he bottom ridge of the V-shaped groove is 45° (an angle formed between both sides of the V-shaped groove is 90°). However, this angle θ is not limited to the above value, but the angle θ may be in a range from 30 to 60° (the angle formed between both sides of the V-shaped groove is 60 to 120°).

Figure 6B:
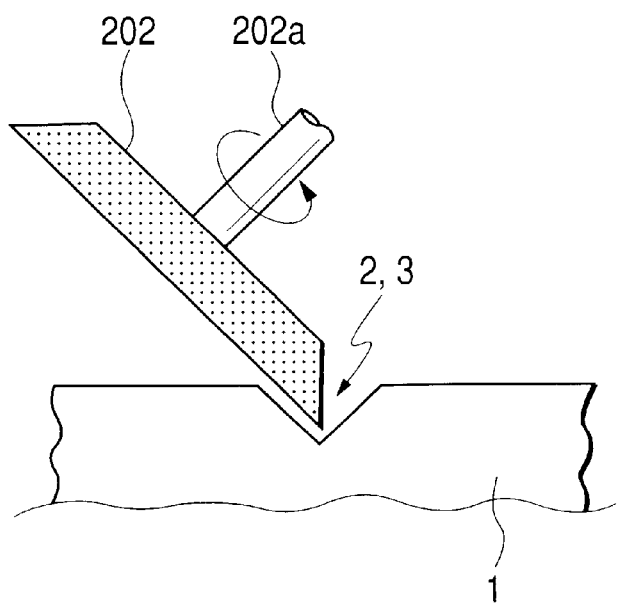

In the above embodiment, the V-shaped groove is formed by grinding in which the grinding wheel for making a V-shaped groove shown in FIG. 6(a) is used so as to conduct formed tool grinding, however, grinding may be conducted by other grinding wheels. FIG. 6(b) is a schematic illustration for explaining a case in which a cup type grinding wheel is used for forming a V-shaped groove. As shown in FIG. 6(b), one side of the V-shaped groove can be ground with the cup type grinding wheel 202, and then the other side of the V-shaped groove can be successively ground with the cup type grinding wheel 202. According to this grinding method, it is possible to decrease surface roughness of the surface to be ground.

Next, the optical unit of the embodiment of the present invention and the method of manufacturing the optical unit will be explained below. The optical unit of this embodiment is a lens tip or lens array in which the spherical lens positioned by the positioning member of the optical element of the above embodiment is fixed to the substrate or other fixing members. Accordingly, in the following explanations, the method of manufacturing the optical unit will be explained focusing on the process after the positioning is conducted by the above positioning member, and the optical unit will be explained together with the manufacturing method.

FIG. 9 is a schematic illustration showing a method of manufacturing the optical unit of the embodiment. Referring to FIG. 9, explanations will be made. On the surface of a substrate made of boro-silicated glass (3.0×25×25 mm), a 25 point grid composed of 5 by 5 V-shaped grooves is formed by the same method of the above embodiment. In this connection, the depth of the V-shaped groove is 0.612 mm. When the depth of the V-shaped groove is set at 0.612 mm, the vertex of the spherical lens 100 is 0.5 mm high from the substrate surface in the case where the spherical lens 100, the diameter of which is 1.0 mm, is made to come into contact with the four ridges composed of the sides of the V-shaped grooves perpendicular to each other. In this case, the pitch between the V-shaped grooves in the longitudinal direction was 5.0 mm, and the pitch between the V-shaped grooves in the lateral direction was also 5.0 mm.

Figure 9A:
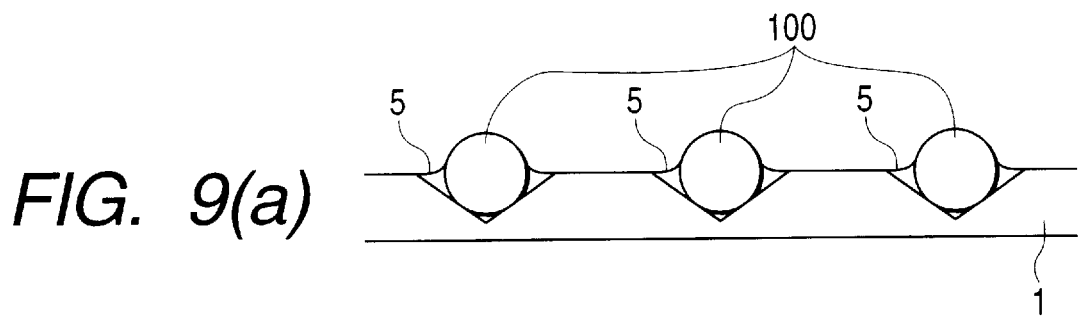
FIGS. 9(a) to 9(d) show a method of manufacturing an optical element of an embodiment.

Next, FIG. 9(a) is a partial cross-sectional view showing the portion. The spherical lens 100, the diameter of which is 1 mm (accuracy of the diameter is ±0.5 μm), is set at each grid point on the glass substrate 1 on which the V-shaped groove grids are formed. While the spherical lens 100 is being supported by the ridges composed of the V-shaped groove sides, a gap formed by the spherical lens and the V-shaped groove sides is filled with the adhesion means 5 such as adhesive or glass solder so that the spherical lens can be fixed on the glass substrate.

Figure 9B:
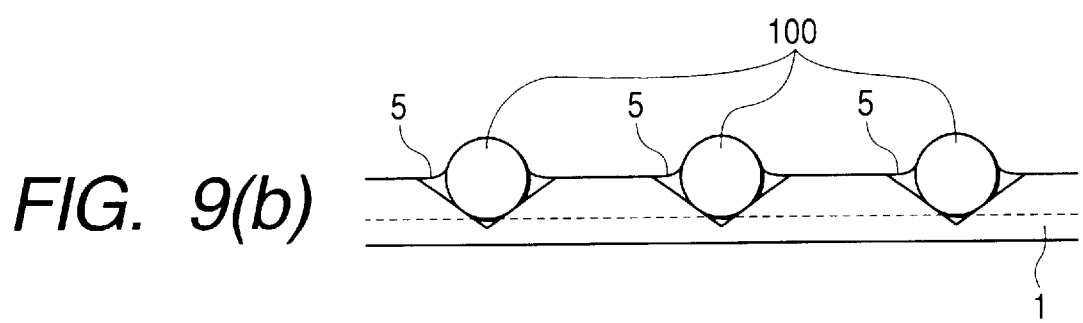
Figure 9C:
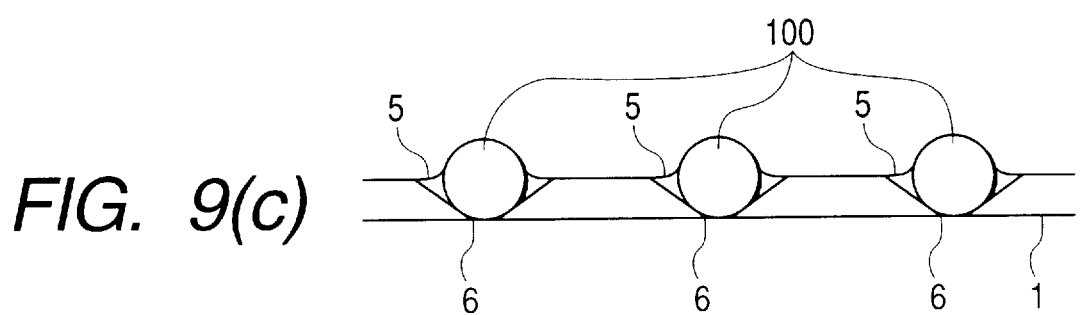
Figure 9D:
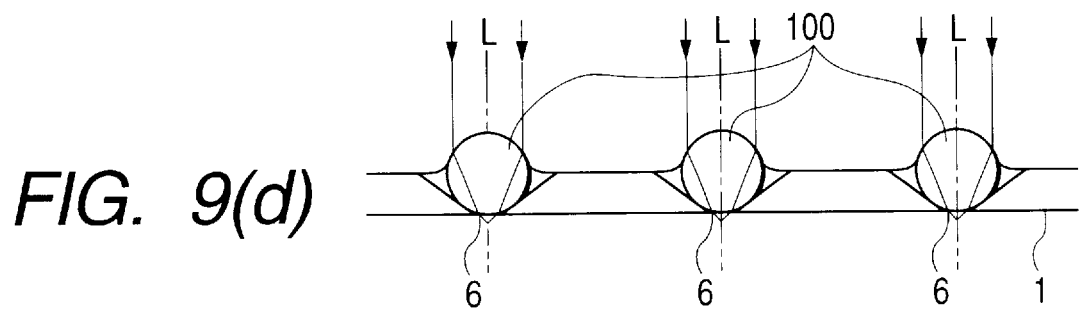

Next, as shown in FIGS. 9(b) to 9(d), a surface of the glass substrate 1, which is opposite to the surface of the glass substrate 1 on which the V-shaped grooves are formed, is ground, and a portion lower than the dotted line in the drawing is removed. In this way, the opening section 6 is formed so that a beam of light can be incident upon or emergent from each spherical lens 100. Due to the foregoing, it is possible to obtain a 5 by 5 lens array which is an optical element of the embodiment. When the collimated laser beam L is incident upon each spherical lens fixed to each grid point of the V-shaped grooves, it is possible to obtain a 25 (5 by 5) point beam spot array via the opening sections 6 formed on the reverse side of the substrate.

The positional accuracy of this beam spot is as high as the positional accuracy of the lens. Therefore, this lens array is effective as a surface light emitting laser array and interconnection of an array type optical element.

After the lenses are fixed and diced, it is possible to use them as a lens chip. The thus formed lens chip is effectively used for the field of micro-optics such as an optical element for an optical pickup, coupling between the optical fibers for optical communication, collimated optical system and neighboring optical system in the optical memory.

When optical elements such as lenses are fixed onto the substrate at a constant pitch (when a lens array substrate is provided), it becomes easy to adopt a fine processing process such as a photolithographic process or etching process. Therefore, it is possible to build a process in which processing can be conducted by a unit of a substrate or wafer. Accordingly, it is possible to obtain a highly effective micro-optics at low manufacturing cost.

Figure 10:
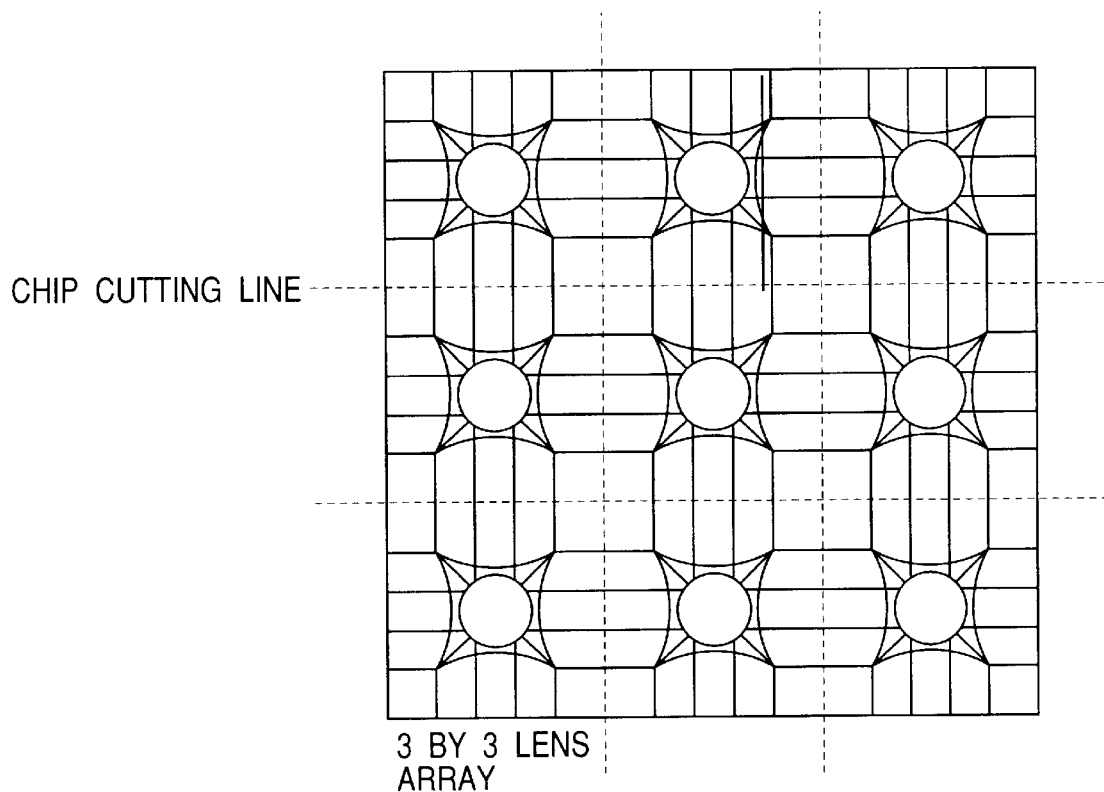
FIG. 10 shows a plan view showing a 3 by 3 lens array manufactured by a method of an embodiment.
Figure 11:
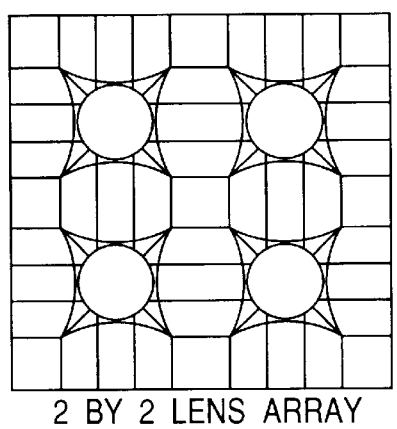
FIG. 11 shows a plan view showing a 2 by 2 lens array manufactured by a method of an embodiment.
Figure 12:
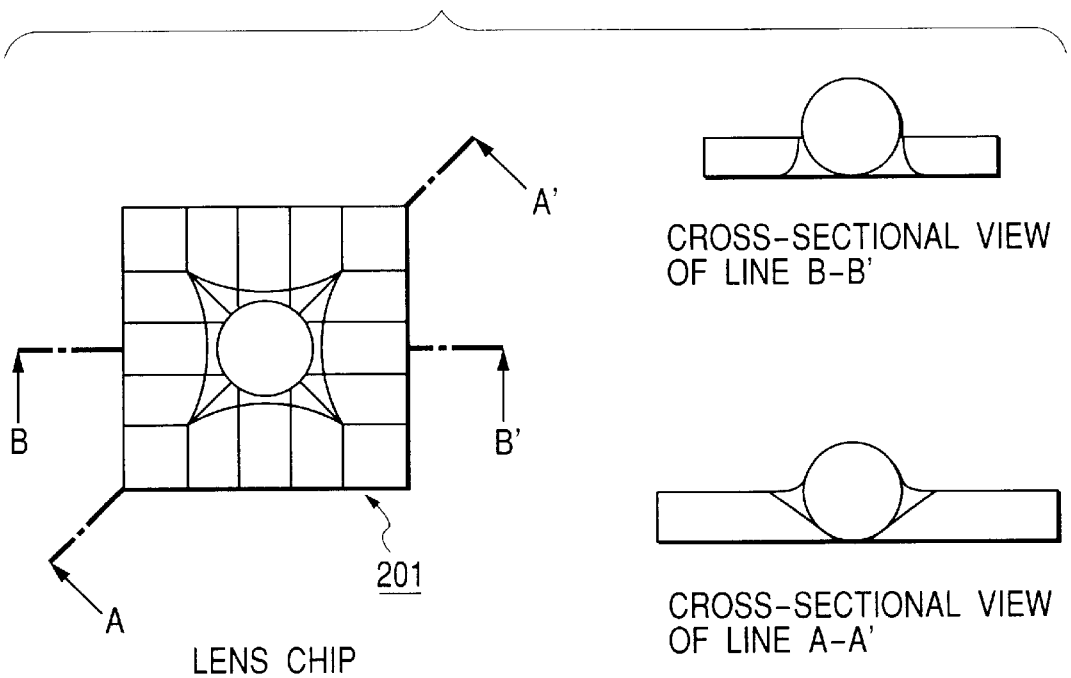
FIG. 12 shows a view showing a lens chip manufactured by a method of an embodiment.
Figure 13:
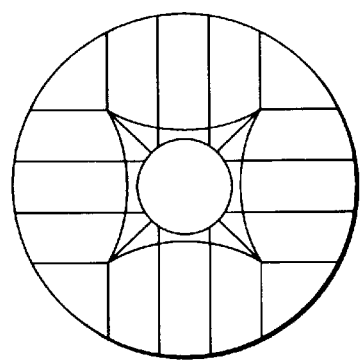
FIG. 13 shows a plan view showing a disk type lens chip.

FIG. 10 is a plan view showing a 3 by 3 lens array manufactured by the method of the embodiment. FIG. 11 is a plan view showing a 2 by 2 lens array manufactured by the method of the embodiment. FIG. 12 is a view showing a lens chip manufactured by the method of the embodiment. The lens chip 201 shown in FIG. 12 is obtained when the lens array shown in FIG. 10 is cut along the dotted line in the view. FIG. 13 is a plan view showing a disk type lens chip. The lens chip shown in FIG. 13 is made ill such a manner that after the lens array has been cut in the same manner as that shown in FIG. 12, the outer circumferential side is ground so as to form a cylinder round the lens center.

Figure 14:
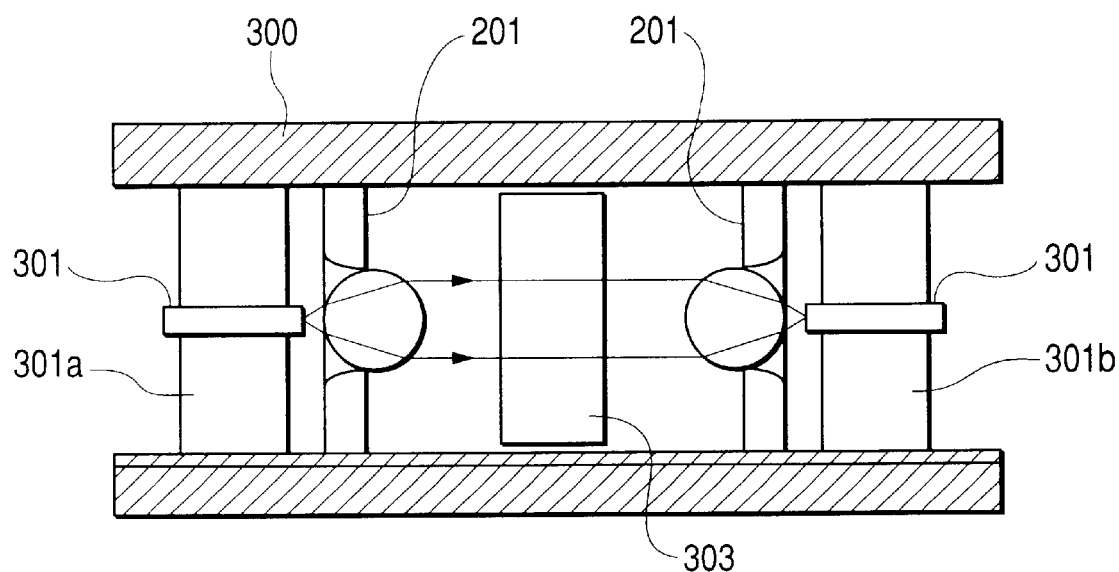
FIG. 14 shows a view showing an example in which a lens chip is actually mounted.
Figure 15:
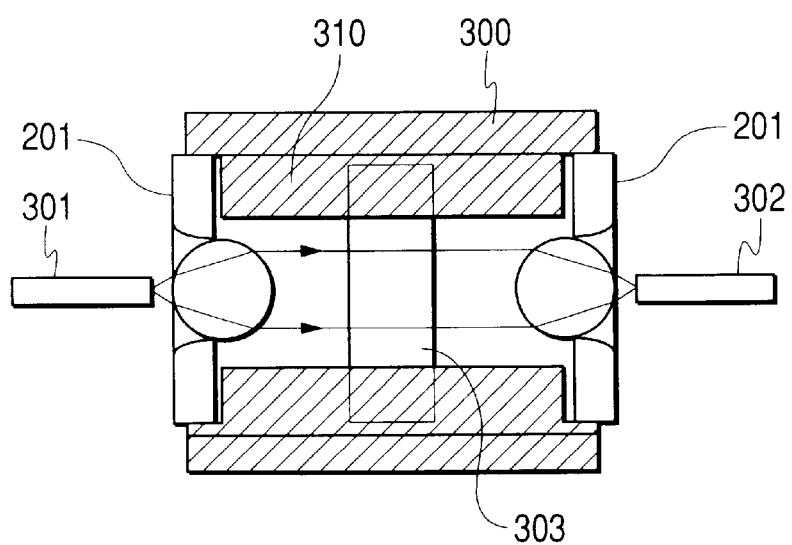
FIG. 15 shows a view showing an example in which a lens chip is actually mounted.

In the case where the lens chip is manufactured by cutting the lens array, if the cutting is conducted with high accuracy so as to obtain a cutting plane of high dimensional accuracy or if the surface and the back face of the substrate is finished with high accuracy, it is possible to position the lens chip at a predetermined optical device while the cutting plane or the surface and back face are used as a positioning reference. FIGS. 14 and 15 are views showing an example of the lens chip which is actually mounted. In the example shown in FIG. 14, while the inner face of the casing 300 and the cutting plane of the lens chip 201 are used as a reference face, positioning is conducted, and the lens chip 201 is attached into the casing 300 so as to make a filter module. In this connection, in the drawing, reference numerals 301, 302 are optical fibers, reference numeral 303 is a filter element, and reference numerals 301a, 302b are fixing members for fixing the optical fibers. According to this embodiment, positioning can be accomplished with high accuracy. Therefore, the optical axis of the spherical lens can be easily adjusted and the light transmitting property can be ensured. Therefore, it is possible to obtain an optical unit with high reliability.

FIG. 15 is a view showing an example in which a filter module is made in such a manner that positioning is conducted while both end faces of the positioning member 310 attached to the inner side face of the casing 300 and the surface and the back face of the lens chip 201 are used as a reference face, positioning is conducted, and the lens chip 201 is attached into the casing 300.

The substrate on which the V-shaped groove grid is thus formed is made of a material that is high in light-transmission (glass, crystallized glass, resin, and the like), whereby a lens with a glass holder can be obtained. In a conventional lens with a metal holder, when it was mounted on a module, since the metal holder has no light-transmission, a light-hardening adhesive (for example, UV hardening adhesive) could not be used. However, by using the above substrate that is high in light-transmission, the light-hardening adhesive can be used. Further, in case that the lens array that has been manufactured by the method according to the embodiment is used, the lenses are accurately fixed onto the substrate on which the V-shaped groove grid is formed. Therefore, at the module assembling time, the upper surface, the rear surface or the side surface of the substrate can be used as a base level of alignment, and the passive alignment is made possible.

FIG. 16 is a schematic drawing showing a method of manufacturing an optical unit of another embodiment. Referring to FIG. 16, the method of manufacturing an optical unit of another embodiment will be explained as follows. First, on the surface of a soda-lime glass substrate 1 (24 by 50 by 50 mm), a 54 point grid composed of 9 by 6 V-shaped grooves is made by the same method as that of the above embodiment. Next, the spherical lens 100, the diameter of which is 1 mm (accuracy of the diameter is ±0.1 (m), is set at each grid point on the glass substrate on which the V-shaped grooves are formed, so that the spherical lens 100 is positioned by the ridges composed of the V-shaped grooves which cross each other (shown in FIG. 16(a)). FIG. 17 is a view showing a result of measurement of the vertex positions of the spheres which are set in the 9 by 6 V-shaped groove glass grid. As can be seen in FIG. 17, it can be understood that the dimensional accuracy is very high, that is, concerning the error of the vertex position of the sphere on the face of the 54 point grid, the minimum is 0.2 $\mu$m, the maximum is 1.1 $\mu$m, and the range is 0.9 $\mu$m.

Figure 16A:
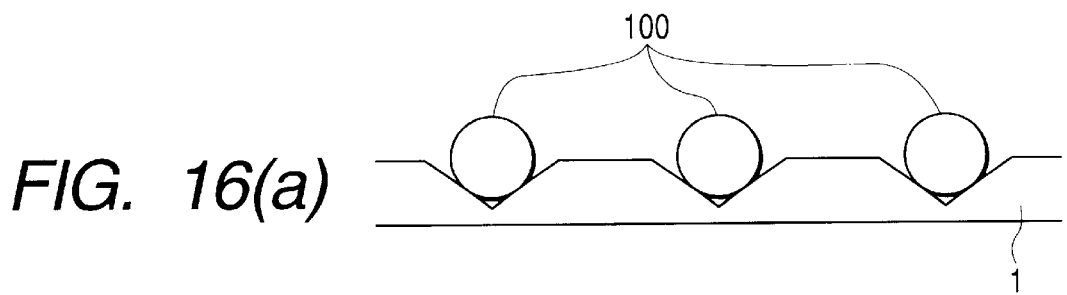
FIGS. 16(a) to 16(e) show a schematic illustration for manufacturing an optical element of another embodiment.
Figure 16B:
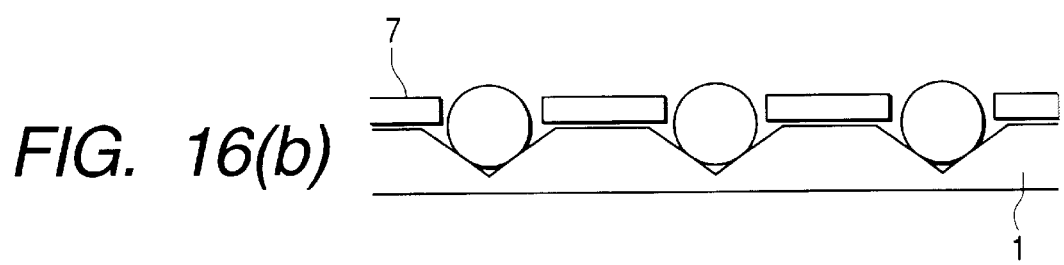
Figure 16C:
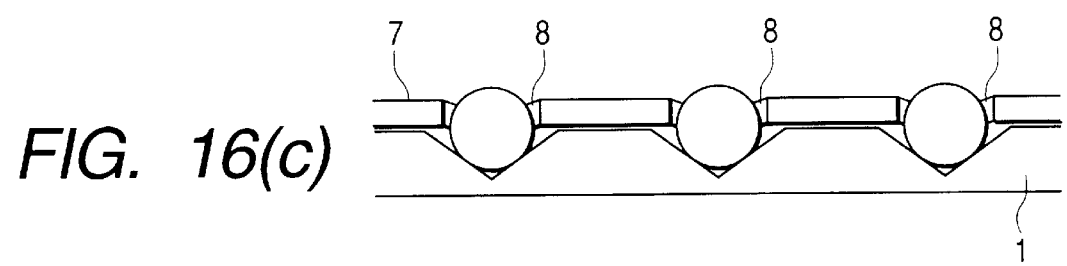

Next, a hole array substrate 7 having holes, each diameter of which is larger than the lens diameter, is set on the V-shaped groove grid glass substrate 1 so that the hole array substrate 7 can be used as a spherical lens holding member (refer to FIG. 16B). Then, the spherical lenses 100 and the sides of the holes of the hole array substrate 7 are fixed to each other with an adhesion means 8 such as an adhesive or glass solder (refer to FIG. 16C). Next, the V-shaped groove grid glass substrate 1, which was used as a positioning jig, is removed from the lenses (refer to FIG. 16D). Through the above process, it is possible to obtain a spherical lens array fixed onto the hole array substrate 7 which is used as a spherical lens holding member. When the collimated laser beam L is incident upon the spherical lens 100 fixed to each grid point of the V-shaped grooves, a beam spot array can be obtained (refer to FIG. 16E).

In this connection, in the process shown in FIG. 16, when the spherical lenses are mounted on the V-shaped groove grid and fixed with adhesive or solder, there is a possibility that the lenses are raised due to the difference in the density of melted solder or the lenses are drawn by a surface tension of melted solder, that is, there is a possibility that the lens positions are shifted by the influence of a force given from the outside. In order to prevent the lenses from being shifted by the influence of a force given from the outside, through-holes, which communicate with the back face of the substrate, are formed, and vacuum is given from the through-holes in the mounting process (shown by FIGS. 16(a) to (c)), so that the lenses are pressed against the ridges of the V-shaped groove grid by the pressure difference. In this way, the lens positions can be effectively prevented from being shifted. There is a possibility that too much adhesive or solder is fed so that adhesive or solder overflows and covers the lens surfaces and the effective diameter of the lens is decreased. However, when the lenses are drawn by vacuum in the above manner, it is possible to prevent the occurrence of the above problems. That is, when the degree of vacuum via the through-holes is monitored and adjusted so that adhesive or solder can be appropriately filled and harmful overflow of adhesive or solder can be easily prevented.

Figure 18A:
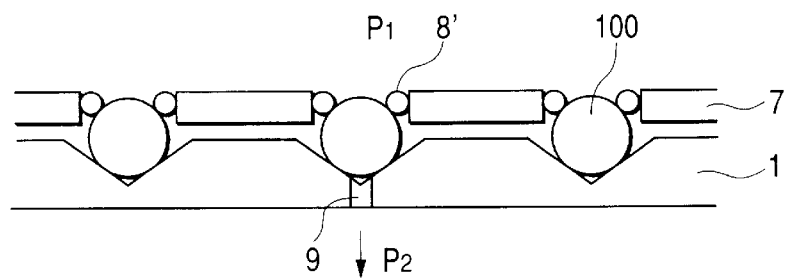
FIGS. 18(a) to 18(c) show a schematic illustration for explaining an optical element of another embodiment.
Figure 18B:
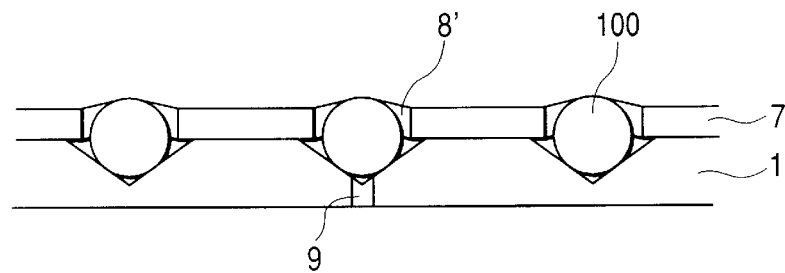
Figure 18C:
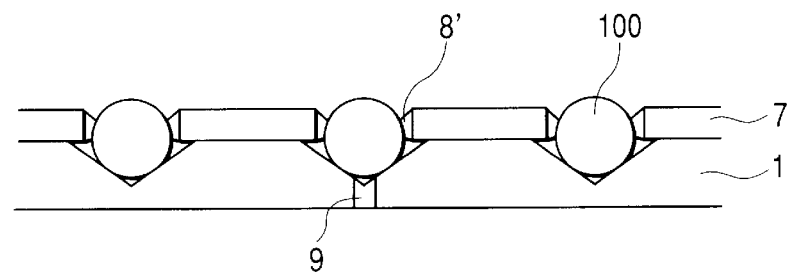
Figure 19:
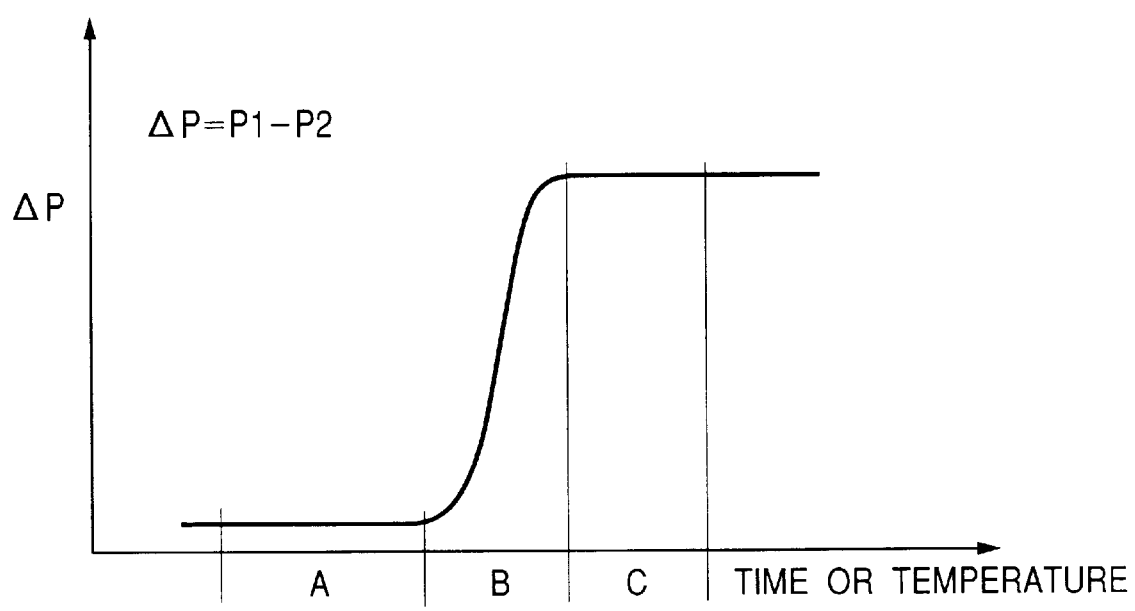
FIG. 19 shows a schematic illustration for explaining an optical element of another embodiment.
Figure 20:
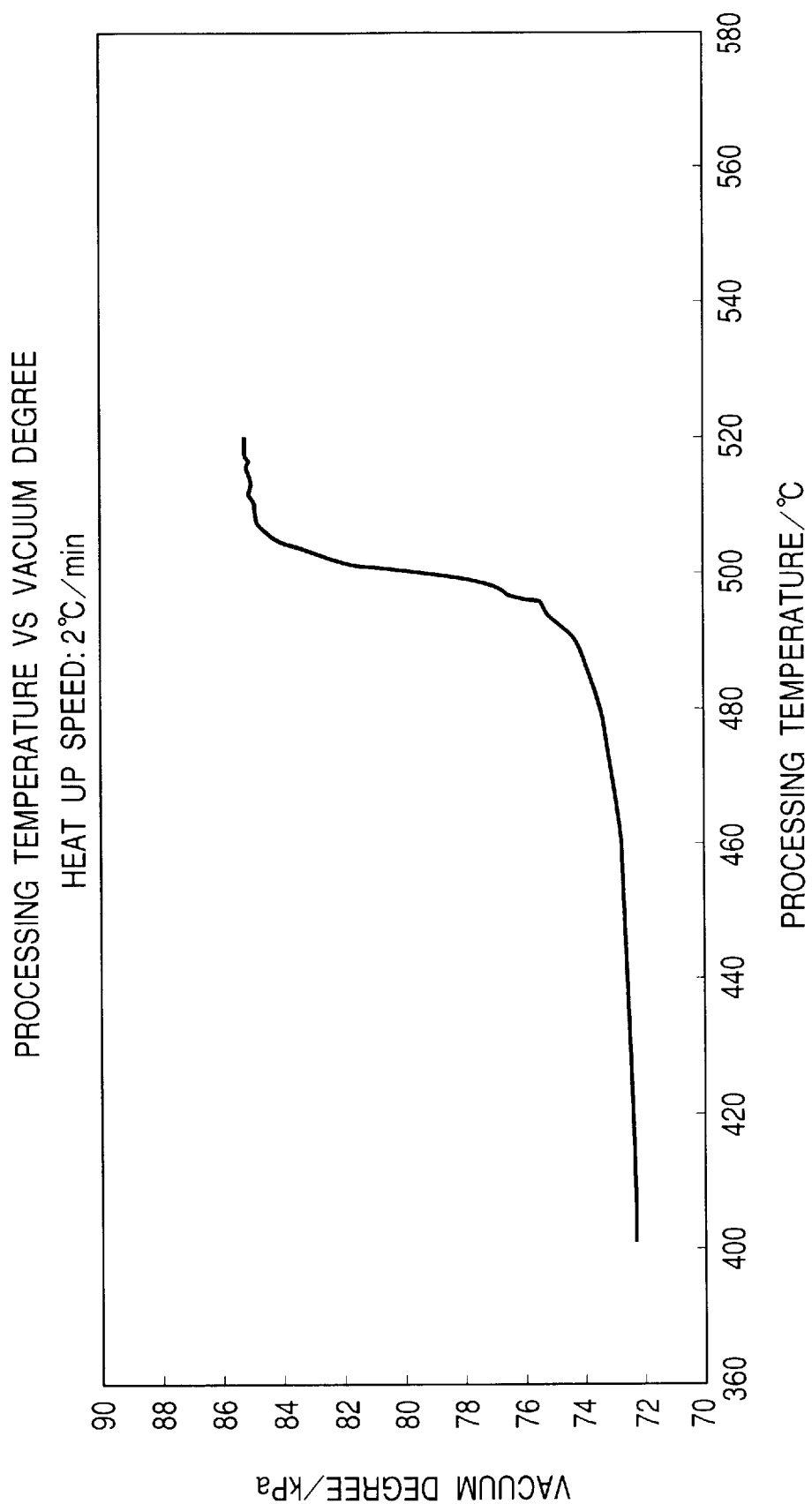
FIG. 20 shows a schematic illustration for explaining an optical element of another embodiment.

The preferable fixing method of the spherical lens by the above vacuum drawing will be further described in detail with reference to FIGS. 18 and 19. First, the portion between the spherical lens 100 and the hole of the hole array substrate 7 is filled with a low melting point glass (glass solder) 8' (for example, PLS-3123 by Nippon Electric Glass Co., Ltd.) functioning as the adhesion means 8. While the vacuum is drawn from one and more through-holes 9 provided in the V-shaped glass grid substrate 1, the temperature is increased till the low melting point glass 8' is melted (refer to FIGS. 8A and 8B). At this time, the pressure difference ΔP between the pressure P2 of the vacuum hole and the external pressure P1 of the spherical lens holding member (=P1–P2) is monitored (refer to FIG. 19). As the portion among the hole array substrate 7, the spherical lenses 100 and the V-shaped groove grid substrate 1 is sealed hermetically and the fluidity of the low melting point glass 8' becomes higher, the hole array substrate is pushed on the side of the V-shaped groove substrate (downward) by the peripheral pressure, so that the gap between the hole array substrate and the V-shaped groove grid glass substrate becomes smaller gradually (region B in a graph of FIG. 19). When the gap between the hole array substrate and the V-shaped groove grid glass substrate becomes zero, the change of the pressure difference ΔP stops and the pressure becomes constant (region C in the graph of FIG. 19). After the change of pressure different became constant, regular intervals are provided. This is performed in order to return the low melting point glass 8' that has been raised by the descent of the hole array substrate 7 to the V-shaped groove substrate side (FIG. 18C). It is important particularly for spherical lens mounting quality to thus return the low melting point glass 8' to the V-shaped groove substrate side in case of a SIL lens substrate for flying head that uses the spherical lens by grinding it into a hemisphere, which will be described later. Namely, by returning the low melting point glass 8' to the V-shaped groove substrate side when the spherical lens has been ground into hemisphere, the recess portions are removed from the rear surface of the hole array substrate and the surface of the low melting point glass, and the hole array substrate and the low melting point glass have the same plane, whereby the portion between the hole array substrate and the hemispherical lens becomes a flat surface. Therefore, in case of the flying head provided with the SIL, the stable head floating can be obtained. In case that the recess portions exist, when the head is floated by the principle of the air bearing, the turbulent flow is caused by the recess portions, so that the floating becomes unstable. FIG. 20 shows the result of the monitor of the pressure difference in case that PLS-3123 by Nippon Electric Glass Co., Ltd. actually used as a low melting point glass is heated up at a heating-up speed of 2° C./min.

By thus monitoring the pressure difference ΔP, the position of each member and the change in the state of the filler can be known in real time, and by adjusting the pressure, their position and state can be controlled. Therefore, the spherical lens that is high in accuracy can be fixed.

The number of the through-holes provided in the V-shaped glass grid substrate 1 in order to give the vacuum may be at least one, and its position is not limited to the position just under the lens.

As described above, when the V-shaped groove glass substrate is used as a positioning member, even if the centers of the holes formed on the hole array substrate are somewhat shifted from the centers of the spherical lenses, the spherical lenses can be highly accurately positioned by the V-shaped groove glass substrate in the fixing process. Therefore, each spherical lens can be stably held at four points. As a result, the spherical lenses can be three-dimensionally mounted on the hole array substrate with high accuracy. It is unnecessary that the allowable tolerance of the hole diameter and pitch of the holes formed on the hole array substrate is made to be severe. That is, the allowable tolerance may be not less than several to several ten (m. Due to the foregoing, it is possible to use a holding member of low cost. According to the method described above, it is possible to repeatedly use the positioning member of the highly accurate optical element, and the spherical lenses can be fixed by a high temperature process such as a process of glass soldering. As a result, it is possible to obtain a spherical lens array of high accuracy, high reliability and low cost.

The positional accuracy between the lens in the spherical lens array mounted in this process corresponds to the positional accuracy of the V-shaped groove grid When material (glass or ceramics, crystallized glass), the material characteristic (the coefficient of thermal expansion especially when glass solder, which requires a thermal process, is used) of which is substantially the same as that of the V-shaped groove grid glass substrate 1, the pitch accuracy is not more than ±1 μm, and the error of the spherical vertex height is in a range not more than 2 μm. When a portion of the sphere of the lens array is ground so that the portion of the sphere can be flat, it is possible to obtain an array of hemispherical lenses or super hemispherical lenses. Further, when dicing is conducted after that, lens chips can be easily provided.

When the glass substrate is used as a positioning member, the material characteristic (the coefficient of thermal expansion, abrasion characteristic, grinding characteristic, elastic coefficient and so forth) of glass and that of glass or ceramics composing the hole array substrate are close to each other. Therefore, even when the spherical lens is pressed by a force so that the spherical lens can be mounted and even when the spherical lens is subjected to a process of high temperature not lower than 200° C. or the spherical lens is subjected to a grinding process, it is possible to suppress the occurrence of deterioration of accuracy, crack and warp which are caused by the difference in the material characteristic.

Figure 16D:
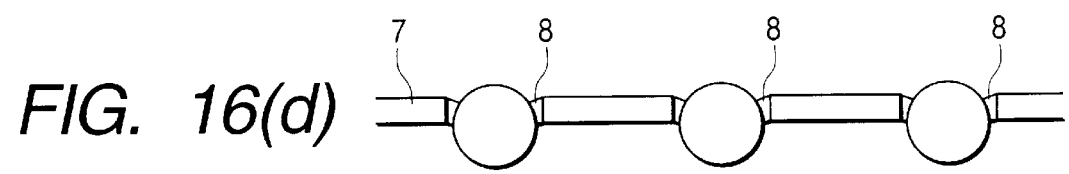
Figure 16E:
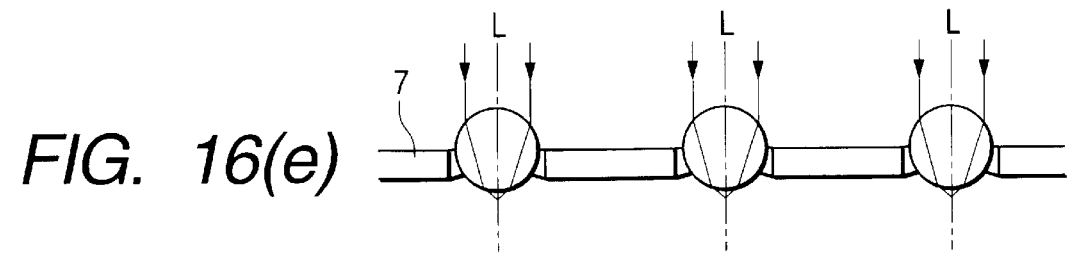
Figure 17:
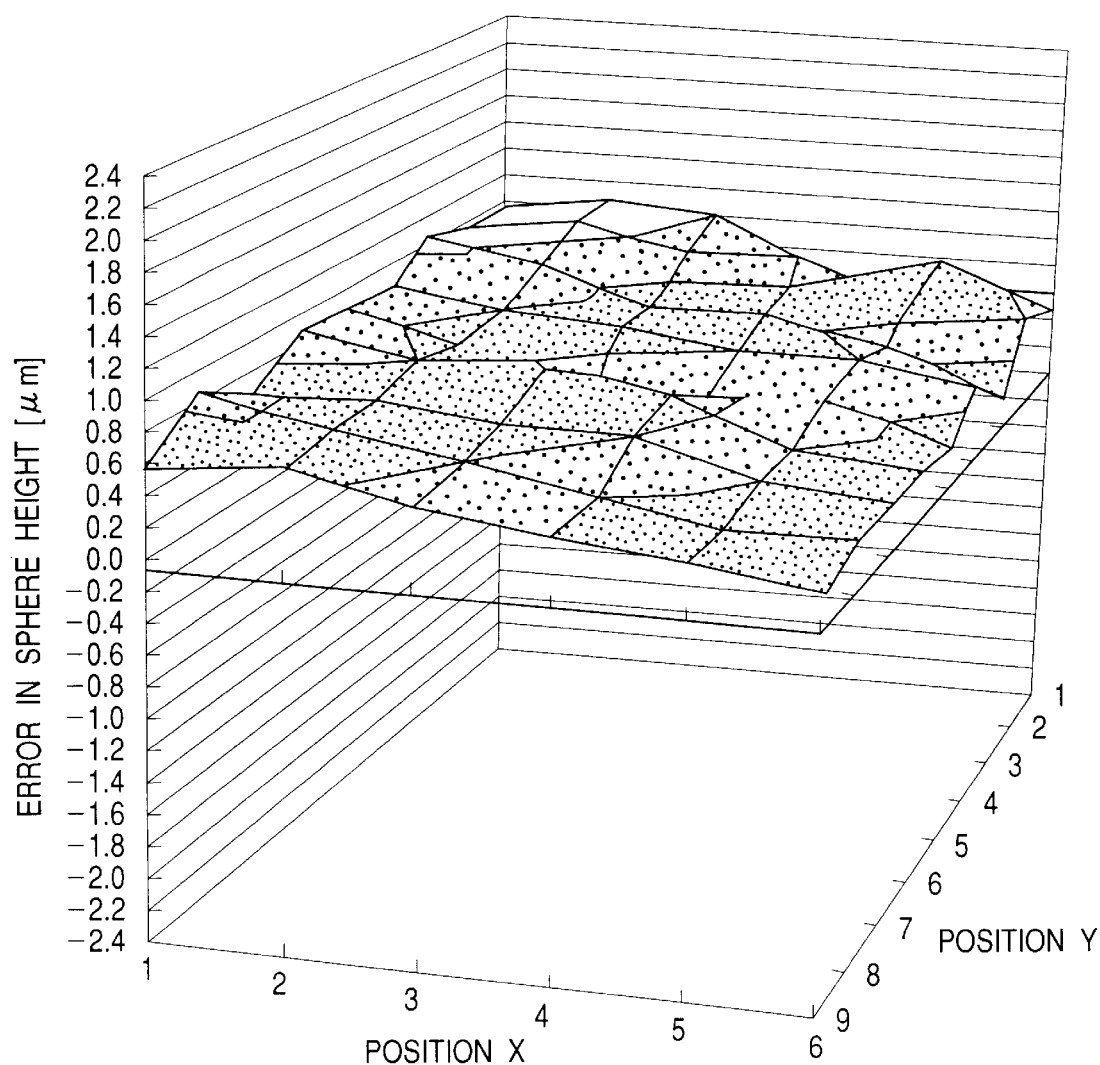
FIG. 17 shows a view showing a result of measurement of the vertex positions of the spheres which are set in the 9 (6 V-shaped groove glass grid.

Further, the lens chips as shown in FIGS. 10 to 13 can be also manufactured using the spherical lens array obtained in FIG. 16D. In this case, the hole array substrate is formed of the material that is high in light-transmission (glass, crystallized glass, resin, and the like), whereby a lens with a glass holder can be obtained. In a conventional lens with a metal holder, when it was mounted on a module, since the metal holder has no light-transmission, a light-hardening adhesive (for example, UV hardening adhesive) could not be used. However, by using the above substrate that is high in light-transmission, the light-hardening adhesive can be used. Further, in case that the lens array that has been manufactured by the method according to the embodiment is used, the lenses are accurately fixed onto the hole array substrate. Therefore, at the module assembling time, the upper surface, the rear surface or the side surface of the substrate can be used as a base level of alignment, and the passive alignment is made possible.

Figure 21A:
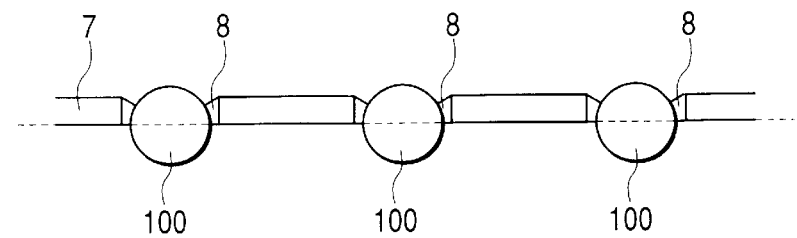
FIGS. 21(a) to 21(e) show a schematic illustration for a method for manufacturing a slider chip using an optical element of another embodiment.
Figure 21B:
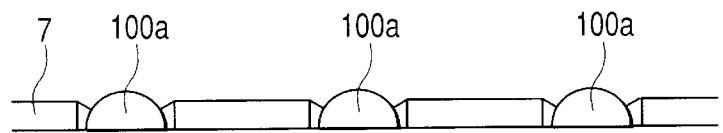
Figure 21C:
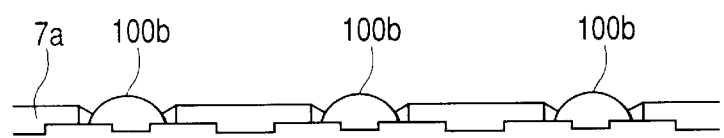
Figure 21D:
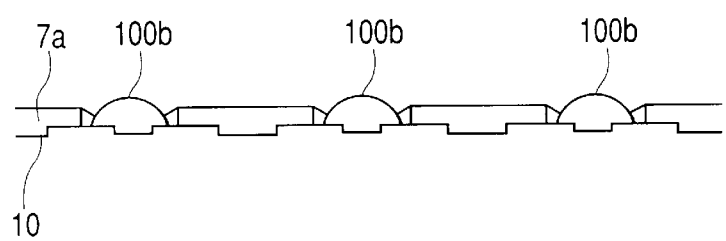
Figure 21E:
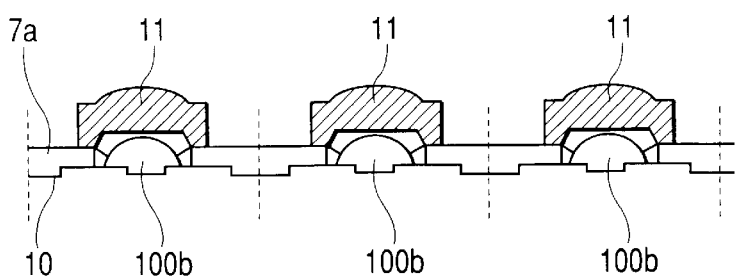

Next, a method of manufacturing a slider chip with SIL (solid immersion lens) used in the known flowing type-optical head for optical memory medium from the spherical lens array obtained in FIG. 16D will be described with reference to FIG. 21. In the slider chips with SILs (solid immersion lenses), as shown in FIG. 21(e), objectives 11 are placed and fixed onto the respective SILs (solid immersion lenses) 100b of the slider substrate 7a. In each region divided by dotted lines in FIG. 21E, one slider chip with SIL is formed. In this case, the hole array substrate 7 is machined into a slider substrate 7a (for example, made of glass) of the slider chips, and the spherical lens 100 is machined into the SIL (solid immersion lens) 100b.

A manufacturing procedure of this SIL (solid immersion lens) 100b is as follows. Namely, the half of the spherical lens 100 supported by the hole array substrate 7 obtained in FIG. 16D, which is exposed from the rear surface of the hole array substrate 7 obtained in FIG. 16D, is removed by grinding (refer to FIGS. 21A and 21B). The spherical lens 100 becomes a hemispherical lens 100a. The grinding method is performed, for example, by an Oscar type one-side grinding method. Next, alignment marks (not shown) are formed by a metal film or the like using photolithography on the basis of the lens position. Next, in order to form recess portions for generating the negative pressure by air bearing, on the basis of the alignment marks, the unnecessary portions are removed by ion milling, etching or the like (refer to FIG. 21C). Hereby, the hole array substrate 7 and the hemispherical lens 100a are respectively formed into the slider substrate 7a and the SIL (solid immersion lens) 100b. Next, a lubricating film 10 is formed on the rear surface of the slider substrate 7a, the objectives 11 are fixed onto the upper surface thereof, and thereafter dicing is performed to cut the substrate 7a into chips (refer to FIG. 21E).

The present invention is explained above referring to the embodiment. In the present invention, when the lenses are fixed at a constant pitch (lens array substrate), fine processing such as photolithographic process or etching can be easily adopted to the lens itself, V-shaped groove substrate and substrate of a holding member to fix the lens. Therefore, it is possible to form a fine profile such as a diffraction grid and micro-hole in accordance with the arrangement of the lens array and the optical axis of the lens, and also it is possible to form an electrode wiring such as a metal coil for detecting a magnetic field. Therefore, it is possible to build a process capable of processing by a unit of a substrate or wafer.

In the present invention, when the lenses are fixed at a constant pitch (lens array substrate), fine processing such as photolithographic process or etching can be easily adopted to the lens itself, V-shaped groove substrate and substrate of a holding member to fix the lens. Therefore, it is possible to form a fine profile such as a diffraction grid and micro-hole in accordance with the arrangement of the lens array and the optical axis of the lens, and also it is possible to form an electrode wiring such as a metal coil for detecting a magnetic field. Therefore, it is possible to build a process capable of processing by a unit of a substrate or wafer.

In this connection, the profile of the member applied to the positioning member of the present invention is not limited to a sphere. A member, a portion of which is formed into a curved face coming into contact with the ridges of a grid point, may be applied to the positioning member of the present invention (a micro cylindrical lens, PC grinding optical fiber ferrule and spherical silicon). The member applied to the positioning member of the present invention is not limited to an optical lens. As long as the member must be made into an array in the manufacturing process or in the function and the member is composed of a profile, a portion of which is formed into a curved face coming into contact with the ridges of a grid point, any member can be applied to the positioning member of the present invention (for example, a PC grinding optical fiber ferrule and spherical silicon). Concerning the material of the V-shaped groove glass substrate, as long as the material is selected so that the material characteristic can agree with that of optical element to be mounted and the holding member, it is possible to use not only boro-silicated glass but also aluminosilicate glass, optical glass, crystallized glass, quartz glass, super hard ceramics, SiC and mono-crystal such as sapphire or ruby. The method of machining a V-shaped groove is not limited to a formed tool grinding conducted by a grinding wheel, but another method of machining a V-shaped groove may be adopted. For example, it is possible to adopt a machining method of polishing, drilling, laser beam machining, electric discharge machining or ultrasonic machining.

As described above, the present invention is characterized as follows. V-shaped grooves, which cross each other, are formed on the surface of a substrate, and an optical element is contacted with four ridges composed of sides of one V-shaped groove and sides of the other V-shaped groove which crosses this V-shaped groove. When the optical element is supported by the four ridges in this way, the optical element is positioned at the three-dimensional support position which is geometrically determined by the four points at which the four ridges and the surface of the optical element come into contact with each other. Due to the foregoing, it is possible to obtain a positioning method of an optical element, positioning member of the optical element and optical unit, and also it is possible to obtain a manufacturing method thereof capable of positioning the optical element such as a spherical lens with high accuracy not more than a few μm.

What is claimed is:

1. A positioning method of an optical element for positioning the optical element by arranging the optical element at an intersection of V-shaped grooves which are formed on a surface of a substrate with crossing each other, wherein when the optical element is arranged at the intersection of the V-shaped grooves, the optical element is supported by four contact points at which four ridges formed in the intersection and a surface of the optical element come into contact with each other so that the optical element is three-dimensionally positioned.

2. A positioning method of an optical element according to claim 1, wherein the V-shaped grooves are formed by means of machining.

3. A positioning method of an optical element according to claim 2, wherein the V-shaped grooves are formed by grinding means having at least a grinding tool.

4. A positioning method of an optical element according to one of claims 1, 2 or 3, wherein the optical element is a spherical lens.

5. A positioning member used for an optical element, comprising:

a substrate,

V-shaped grooves formed on a surface of the substrate, wherein the optical element is positioned when the optical element is supported at four points on four ridges formed in an intersection of the V-shaped grooves.

6. A positioning member of an optical element according to claim 5, wherein the intersection of the V-shaped grooves is formed into an array-shape.

7. A positioning member of an optical element according to claim 5 or 6, wherein the substrate is made of glass.

8. An optical unit comprising;

a substrate on which V-shaped grooves crossing each other are formed the surface thereof, and an optical element positioned and fixed in such a way that said optical element is supported at four points on four ridges formed in the intersection of the V-shaped grooves.

9. An optical unit according to claim 8, wherein an opening used for an incoming beam or an outcoming beam in accordance with the optical element formed on the substrate.

10. An optical unit according to claim 8 or 9, wherein the optical element is a spherical lens.

11. An optical unit according to claim 8 or 9, wherein at least one of said substrate and said optical element is made of glass.

12. An optical unit according to any one of claims 8 or 9, wherein the three-dimensional positional accuracy of the optical element is in a range from −5 µm to 5 µm.

13. A manufacturing method of an optical unit comprising the steps of:

a positioning step for positioning an optical element when the optical element is supported at four points on four ridges formed in an intersection of V-shaped grooves; and a fixing step for fixing the optical element, which has been positioned in the positioning step, at the substrate or an optical element fixing member except for the substrate, wherein said V-shaped groove is formed on a surface of the substrate with crossing each other.

14. A manufacturing method of an optical unit comprising the steps of:

a positioning step for positioning an optical element when the optical element is supported at four points on four ridges formed in an intersection of V-shaped grooves;

a fixing step for fixing the optical element, which has been positioned in the positioning step, at the substrate or an optical element fixing member except for the substrate; and an opening forming step for forming an opening by removing a part of the substrate so as to pass an incoming beam or an outcoming beam of the optical element, wherein said V-shaped groove is formed on a surface of the substrate with being crossed each other.

15. A lens chip which is manufactured by diving the optical unit having the plural optical elements, which has been manufactured by the manufacturing method of the optical unit according to claim 14.

16. A manufacturing method of an optical unit according to claim 13 or 14, wherein the V-shaped grooves are formed by means of machining.

17. A manufacturing method of an optical unit according to one of claims 13 or 14, wherein the V-shaped grooves are formed by grinding means having at least a grinding tool.

18. A manufacturing method of an optical unit according to one of claims 13 or 14, wherein the optical element is a spherical lens.

19. A manufacturing method of an optical unit in which a hemispherical or super hemispherical optical elements are held, comprising the steps of:

a positioning step for positioning an optical element in such a way that the optical element is supported by four points located on four ridges formed in an intersection of V-shaped grooves of a substrate, which cross each other on a surface of the substrate;

a fixing step for housing at least a part of the upper portion of the optical element, which is positioned in said positioning step, in a housing hole of a hole array substrate, of which diameter is larger than that of said optical element, and fixing said optical element on side surfaces of said housing hole; and a lens grinding step, wherein after said substrate is removed, the exposed portion of the optical element that is fixed onto said hole array substrate is grinded and removed.

20. A lens chip wherein it is manufactured by diving the optical unit having the plural optical elements, which has been manufactured by the manufacturing method of the optical unit according to claim 19.

21. A floating-type head for optical memory medium having an optical system including a lens chip for optically reading data recorded on an optical memory medium by float-running on the optical memory medium, wherein said floating-type head is manufactured by using the lens chip according to claim 20 as said lens chip.

22. A manufacturing method of an optical unit according to claims 13, 14 or 19, wherein said substrate has through-holes communicating with the substrate rear surface at said V-shaped grooves, and at least said fixing step includes a step of drawing vacuum from said through-holes.

* * * * *